a2 United States Patent
Castro et al.

(10) Patent No.: US 8,955,058 B2
(45) Date of Patent: Feb. 10, 2015

(54) AUTOMATICALLY GENERATING CHALLENGE QUESTIONS INFERRED FROM USER HISTORY DATA FOR USER AUTHENTICATION

(71) Applicant: International Business Machines Corporation, Armonk, NY (US)

(72) Inventors: Paul C. Castro, Sharon, MA (US); Joseph W. Ligman, Wilton, CT (US); David M. Lubensky, Brookfield, CT (US); Marco Pistoia, Amawalk, NY (US); John J. Ponzo, Hawthorne, NY (US); Umut Topkara, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 13/678,173

(22) Filed: Nov. 15, 2012

(65) Prior Publication Data

US 2014/0137203 A1    May 15, 2014

(51) Int. Cl.
G06F 21/31    (2013.01)

(52) U.S. Cl.
USPC .................................... 726/4; 726/17; 726/28

(58) Field of Classification Search
CPC ............ G06F 21/31; G06F 2221/2103; G06F 2221/2111; H04L 63/10; H04L 9/3271; H04L 63/08; H04L 63/107; H04L 63/164
USPC .................................................. 726/4, 17, 28
See application file for complete search history.

(56) References Cited

U.S. PATENT DOCUMENTS

| 7,058,817 | B1 | 6/2006 | Ellmore | |
|---|---|---|---|---|
| 7,874,011 | B2 | 1/2011 | Boss et al. | |
| 8,219,823 | B2 | 7/2012 | Carter | |
| 2002/0077978 | A1 | 6/2002 | O'Leary et al. | |
| 2003/0140089 | A1 * | 7/2003 | Hines et al. | 709/202 |
| 2006/0026421 | A1 * | 2/2006 | Gasparini et al. | 713/156 |
| 2008/0052245 | A1 | 2/2008 | Love | |
| 2008/0066165 | A1 * | 3/2008 | Rosenoer | 726/5 |
| 2008/0168540 | A1 | 7/2008 | Agarwal et al. | |
| 2008/0288299 | A1 | 11/2008 | Schultz | |
| 2008/0319869 | A1 * | 12/2008 | Carlson et al. | 705/26 |
| 2008/0319904 | A1 | 12/2008 | Carlson et al. | |

(Continued)

FOREIGN PATENT DOCUMENTS

| WO | WO 2011142225 A1 * | 11/2011 |
|---|---|---|
| WO | 2014078154 A2 | 5/2014 |

OTHER PUBLICATIONS

IBM, "Improved Method for Resetting Online Credential," IP.com No. IPCOM000190516D, Dec. 3, 2009, 9 pages.

(Continued)

Primary Examiner — Joseph P Hirl
Assistant Examiner — Kalish Bell
(74) Attorney, Agent, or Firm — Yee & Associates, P.C.; Anne Dougherty

(57) ABSTRACT

User authentication is provided. At least one of a social network and a business network of each user in a plurality of users is accessed. User history data of each user in the plurality of users is monitored in the at least one of the social network and the business network. Challenge questions requiring a user response are generated based on monitoring the user history data of the users. The user response to a generated challenge question is evaluated. A set of events is triggered based on evaluating the user response.

19 Claims, 9 Drawing Sheets

(56) References Cited

U.S. PATENT DOCUMENTS

| | | | |
|---|---|---|---|
| 2009/0052870 A1* | 2/2009 | Marsh et al. | 386/124 |
| 2009/0198587 A1* | 8/2009 | Wagner et al. | 705/26 |
| 2009/0265773 A1 | 10/2009 | Schultz | |
| 2009/0327131 A1 | 12/2009 | Beenau et al. | |
| 2010/0114776 A1 | 5/2010 | Weller et al. | |
| 2012/0131340 A1* | 5/2012 | Teuwen et al. | 713/168 |
| 2012/0214442 A1* | 8/2012 | Crawford et al. | 455/411 |
| 2012/0221955 A1 | 8/2012 | Raleigh et al. | |
| 2013/0054602 A1* | 2/2013 | Kami | 707/737 |
| 2013/0133055 A1* | 5/2013 | Ali et al. | 726/7 |
| 2014/0137219 A1* | 5/2014 | Castro et al. | 726/6 |

OTHER PUBLICATIONS

Office action regarding U.S. Appl. No. 13/735,382, dated May 23, 2014, 23 pages.

International Search Report and Written Opinion, dated May 7, 2014, regarding Application No. PCT/US2013/068832, 8 pages.

* cited by examiner

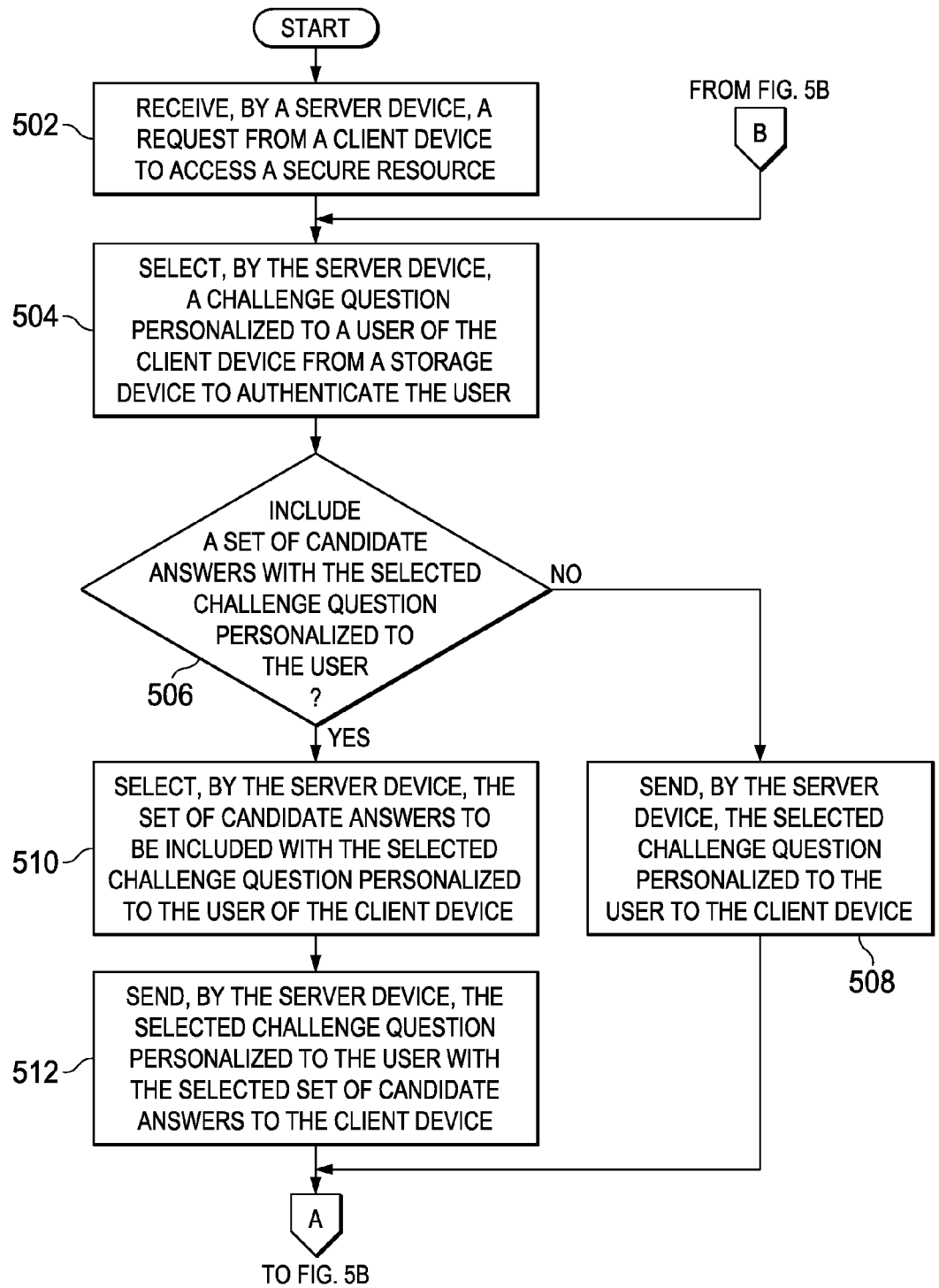

AUTOMATICALLY GENERATING CHALLENGE QUESTIONS INFERRED FROM USER HISTORY DATA FOR USER AUTHENTICATION

BACKGROUND

1. Field

The disclosure relates generally to user authentication and more specifically to automatically generating challenge questions inferred from user history data for user authentication.

2. Description of the Related Art

User authentication is a critical component in the security of any data processing system. Authenticating a user's identity is a first step in providing access control to resources of the data processing system. Typically, authentication processes rely on username and password combinations to authenticate a user. While this username/password authentication technology is not foolproof, it has been serviceable as an authentication method for decades.

SUMMARY

According to one illustrative embodiment, a method for user authentication is provided. A data processing system accesses at least one of a social network and a business network of each user in a plurality of users. The data processing system monitors user history data of each user in the plurality of users in the at least one of the social network and the business network. The data processing system generates challenge questions requiring a user response based on the monitoring of the user history data of the users. The data processing system evaluates the user response to a generated challenge question. The data processing system triggers a set of events based on evaluating the user response.

BRIEF DESCRIPTION OF THE SEVERAL VIEWS OF THE DRAWINGS

FIG. 5A and FIG. 5B are a flowchart illustrating a process for performing user authentication in accordance with an illustrative embodiment;

DETAILED DESCRIPTION

Figure 1:
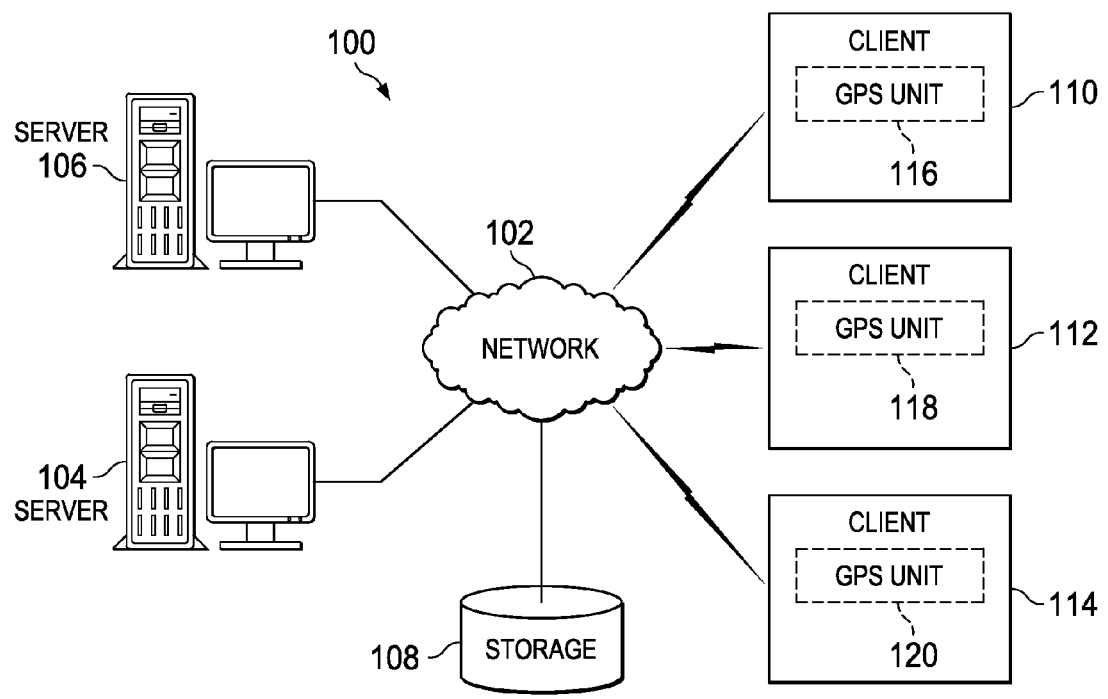
FIG. 1 is a pictorial representation of a network of data processing systems in which illustrative embodiments may be implemented.

As will be appreciated by one skilled in the art, aspects of the illustrative embodiments may be embodied as a computer system, computer implemented method, or computer program product. Accordingly, aspects of the illustrative embodiments may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the illustrative embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
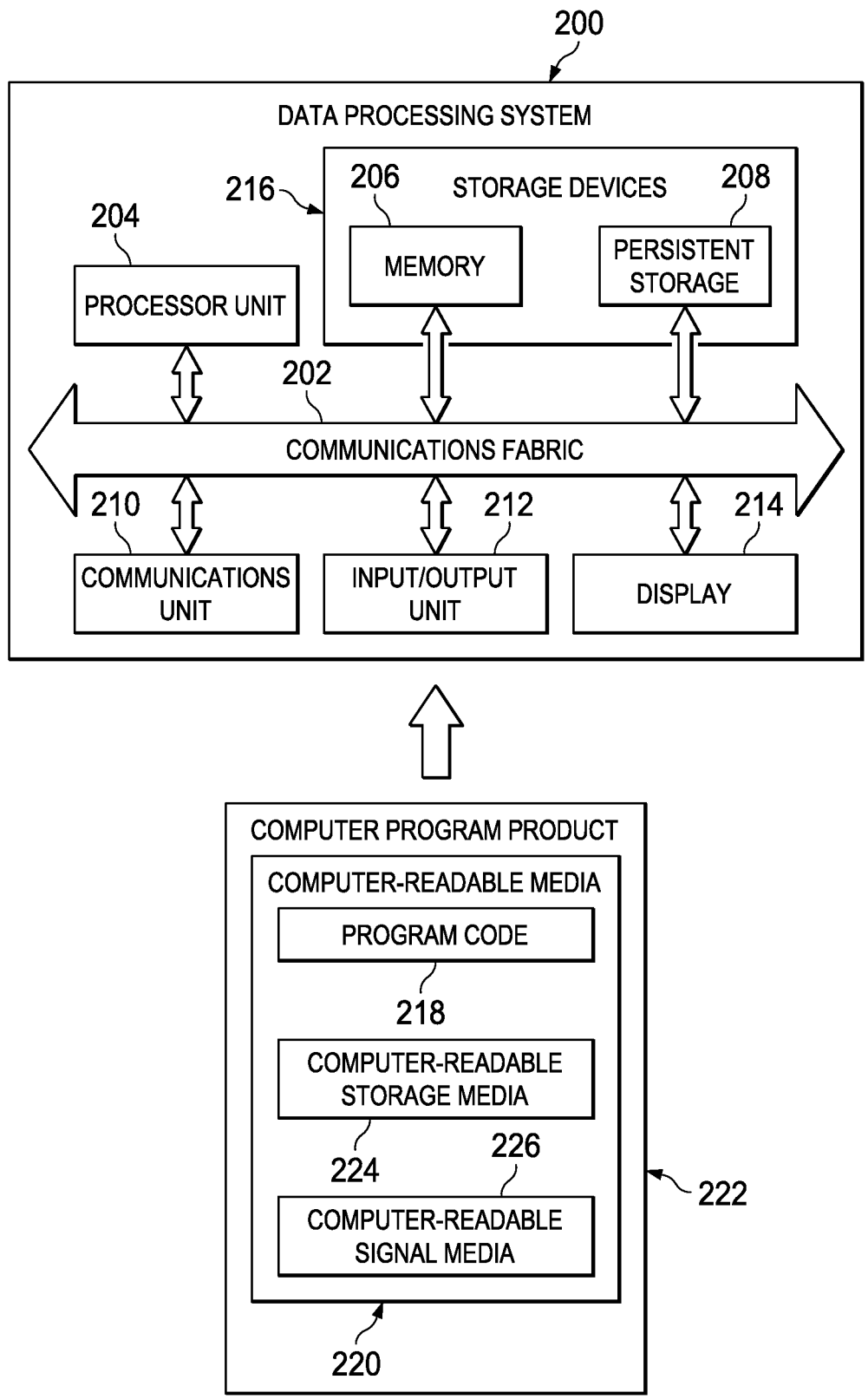
FIG. 2 is a diagram of a data processing system in which illustrative embodiments may be implemented.
Figure 3:
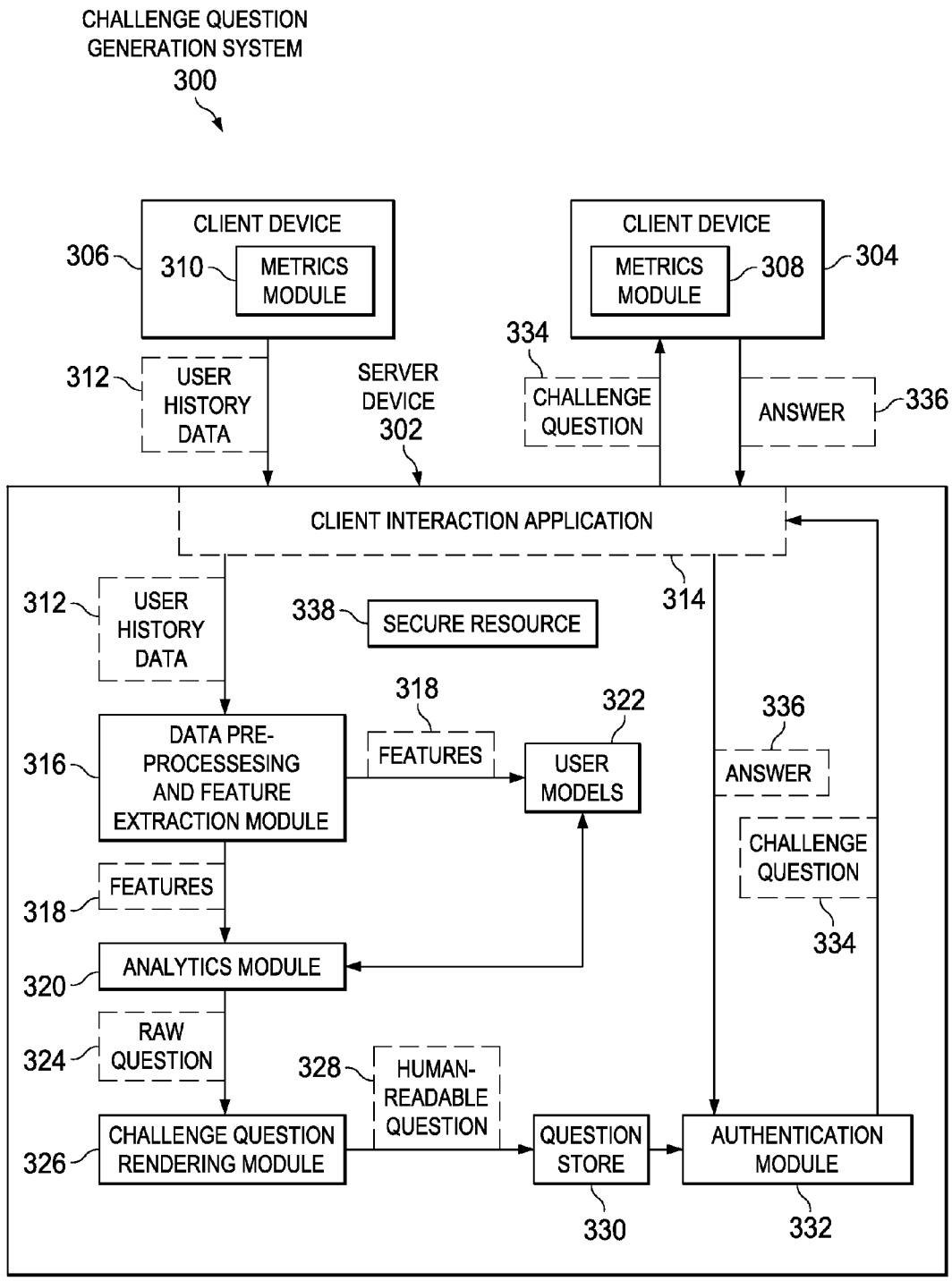
FIG. 3 is a diagram illustrating an example of a challenge question generation system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other various devices connected together within network data processing system 100. Network 102 may include connections, such as wire, wireless communication links, or fiber optic cables.

In the depicted example, server 104 and server 106 connect to network 102, along with storage unit 108. Server 104 and server 106 may be, for example, server computers with high speed connections to network 102. In addition, server 104 and/or server 106 may provide services for authenticating users of client devices connected to network 102 by challenging the users to provide correct answers to generated questions, which are personalized to each of the users, prior to the users accessing secure resources in network data processing system 100. A secure resource may be, for example, a document, a software application, or a hardware component in network data processing system 100 that has restricted access by only authorized and authenticated users.

Clients 110, 112, and 114 also connect to network 102. Clients 110, 112, and 114 are clients to server 104 and/or server 106. In the depicted example, server 104 and/or server 106 may provide information, such as boot files, operating system images, and applications to clients 110, 112, and 114.

Clients 110, 112, and 114 may be, for example, mobile data processing systems, such as cellular telephones, smart phones, personal digital assistants, gaming devices, handheld computers, or any combination thereof, with wireless communication links to network 102. Clients 110, 112, and 114 may also include other types of data processing systems, such as personal computers, network computers, or portable computers, such as laptop computers. Also, clients 110, 112, and 114 may include a global positioning system (GPS) unit, such as global positioning system units 116, 118, and 120.

Global positioning system units 116, 118, and 120 provide location data corresponding to movement of clients 110, 112, and 114 over a period of time. The location data may be, for example, global positioning system coordinates of clients 110, 112, and 114 during the period of time. The period of time may be, for example, a predetermined interval of time, such as every minute, hour, day, week, month, or any other increment to time.

In addition, clients 110, 112, and 114 may send the location data corresponding to the movements of clients 110, 112, and 114 to server 104 and/or server 106. Upon receiving the location data corresponding to the movements of clients 110, 112, and 114, server 104 and/or server 106 analyze the location data by utilizing, for example, a clustering program to generate clusters of location data for each of clients 110, 112, and 114. Each cluster of location data may represent, for example, a geographic location where a client device stayed for more than a threshold period of time. If a client device stayed at a particular geographic location for more than the threshold period of time, then server 104 and/or server 106 may determine that a user of that client device may have an increased level of interest in that particular geographic location. Further, server 104 and/or server 106 may also associate that particular geographic location to a known landmark on a map. The known landmark may be, for example, a restaurant, a theater, a business, a historic site, a park, a residence, a street, a city, a state, a country, et cetera. Furthermore, server 104 and/or server 106 may include the associated known landmark in a user model that corresponds to the user of the client device for future reference when generating challenge questions personalized to that user.

Moreover, clients 110, 112, and 114 may send other data, such as, for example, user history data associated with users of clients 110, 112, and 114 to server 104 and/or server 106. The user history data may include, for example, when a user accessed a particular application of a client device, the name of that particular application, and what actions were taken by the user when interacting with that particular application, such as the user making entries in a calendar application; or when the user accessed a particular web site using the client device, the name of that particular web site, and what actions were taken by the user when interacting with the particular web site, such as the user making an online purchase of particular product. Of course, the user history data may include any information that may be collected by a client device regarding a user's activities on the client device. Also, upon receiving the user history data from a client device, server 104 and/or server 106 may add the user history data of a particular user to a user model that corresponds to that particular user. Server 104 and/or server 106 may utilize the user history data in a user model to generate challenge questions personalized to a particular user in addition to, or instead of, utilizing the collected location data corresponding to movements of a client device associated with that particular user.

Storage unit 108 is a network storage device capable of storing data in a structured or unstructured format. Storage unit 108 may provide, for example, storage of names and identification numbers of a plurality of users, user models corresponding to the plurality of users, user history data, location data corresponding to movements of client devices, generated challenge questions, generated answers to the challenge questions, generated challenge question and answer templates, and network addresses, such as uniform resource locators (URLs), of social and business networks associated with each user in the plurality of users. Furthermore, storage unit 108 may store other data, such as security information that may include user names, passwords, and/or biometric data associated with system administrators and other users of the personalized challenge question generation service.

Moreover, it should be noted that network data processing system 100 may include any number of additional server devices, client devices, and other devices not shown. Program code located in network data processing system 100 may be stored on a computer recordable storage medium and downloaded to a computer or other device for use. For example, program code may be stored on a computer recordable storage medium on server 106 and downloaded to client 114 over network 102 for use on client 114.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 or client 110 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device does not include a non-statutory propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in this example, provides for communication with other data processing systems or devices. Communications unit 210 may provide communications through the use of either or both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 218 is located in a functional form on computer readable media 220 that is selectively removable and may be loaded onto or transferred to data processing system 200 for running by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 224 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that one problem with using passwords to authenticate users is that users frequently forget their usernames and/or passwords to their many different secure service accounts. For example, users often have to juggle between multiple secure service accounts, which require user authentication, each service account having its own policies for setting usernames and passwords. Even password wallets, which may store multiple username/password combinations in one place for a user, require a password to access its contents.

Also, current password recovery systems are a type of authentication method. For example, a password recovery system must reliably establish a user's identity in order to recover or reset the user's current password. In addition, current password recovery systems must rely on a set of predefined security questions with personalized answers set by the users. During password recovery, a password recovery system will present one or more of these predefined security questions to the user. If the user correctly answers the questions, the user is allowed to continue with password recovery.

Ideally, security systems based on predefined security questions should ensure that the questions presented to a particular user are only answerable by that particular user. Further, the security systems should only provide a minimum necessary cognitive load on the user interacting with the security system. For example, it is well known that users dislike and will frequently attempt to circumvent security systems if the security systems are too difficult for the user to use.

However, formulating personalized security questions to each user can be a difficult task. For example, one problem with current security questions is that the security questions are predefined, remain fixed for a lifetime of the security system, and are common to all users of the security system. A common security question applied to all users, such as "How old were you when you got married?" does not apply to users that are single. Also, with the advent of public social media sites, user profile information may easily be discovered online by security system hackers. As a result, a security system hacker may derive answers to predefined security questions from discoverable online user profile information.

As a result, illustrative embodiments provide a user authentication system that is based on personalized challenge questions that are automatically generated from user history data and/or location data associated with each particular user of the authentication system. Illustrative embodiments are suited for mobile devices because mobile devices are able to provide a rich set of data regarding user interactions with the mobile devices and movements of the mobile devices. However, illustrative embodiments may be applied to other data processing systems and is not exclusive to mobile devices.

Illustrative embodiments authenticate a user by the user answering one or more personalized challenge questions that are automatically generated by illustrative embodiments. Illustrative embodiments generate the personalized challenge questions based on the actions of a particular, which illustrative embodiments determine are unique to that particular user and not likely to be answerable by others. These personalized challenge questions are not static and are based on highly personalized knowledge about the user actions and activities. For example, one personalized challenge question may be "With whom did you have lunch yesterday?" Another example of a personalized challenge question may be "Who was the main presenter at the conference you attended at 3:00 p.m. last Monday?" An authorized user should be able to easily answer both of these personalized challenge questions. However, a security system hacker should find these types of personalized challenge questions very difficult to answer. However, security system hackers may potentially find answers to personalized challenge questions if the security system hackers know which challenge questions will be asked beforehand. To prevent the security system hackers from knowing which challenge questions will be asked, illustrative embodiments dynamically generate personalized challenge questions based on unique and timely information regarding user actions and activities. In addition, illustrative embodiments change these personalized questions on a periodic basis to make it even more challenging for a hacker to guess the answers.

Assuming an authorized user needs to be authenticated to access a secure resource, illustrative embodiments will first select a personalized challenge question for that authorized user from a stored set of personalized challenge questions, which the illustrative embodiments generated from collected information regarding the authorized user's actions and activities. The set of personalized challenge questions is unique for the authorized user because the set of personalized challenge questions is based on recent and distinguishable actions and activities of the authorized user. Once illustrative embodiments select a personalized challenge question, illustrative embodiments present the personalized challenge question and then prompt the user for an answer.

In addition, illustrative embodiments also may generate reasonable candidate answers for each challenge question. Consequently, illustrative embodiments may present a personalized challenge questions with a set of multiple choice answers and allow a user to select an answer from this set of multiple choice answers. It is important that each generated candidate answer in the set of multiple choice answers appears to be a reasonable answer to the challenge question so that a hacker finds it very difficult to determine the correct answer. For example, illustrative embodiments may use past correct answers to a personalized challenge question, but now determined to be incorrect answers, as candidate answers. Alternatively, illustrative embodiments may use generic candidate answers that may appear to be correct to a hacker but not to the authorized user. For example, the personalized challenge question "Who did you last meet for dinner in the city?" is dependent on time. Unless the authorized user meets the same person for dinner all the time in the city, candidate answers to the personalized challenge question could be the name of any person the authorized user ever met for dinner in the city, while the correct answer is the last person the authorized user met for dinner in the city.

Alternative illustrative embodiments may allow a user to input a natural language answer instead of selecting an answer from a set of multiple choice answers. The alternative illustrative embodiments may use syntax matching or natural language processing to accept an inputted natural language answer from a user to a challenge question. As a result, illustrative embodiments may need to determine whether a user's inputted natural language answer is similar to the correct answer.

If a user provides a correct answer to a personalized challenge question, then illustrative embodiments may authenticate the user to access the secure resource. Also, illustrative embodiments may allow the user to try multiple times to authenticate with different challenge questions if an incorrect answer is provided by the user. If the user cannot correctly answer any of the presented challenge questions, then illustrative embodiments will not authenticate the user to access the secure resource.

Illustrative embodiments instrument mobile devices with, for example, a software agent that monitors and collects various contextual data from the mobile devices. The contextual data may include, for example, location data regarding movements of a mobile device, applications a user accessed on the mobile device, interactions with services provided by the mobile device, such as telephone calls made and received, text messages sent and received, and internet web sites accessed, and other information associated with a user, such as contact lists, calendar entries, et cetera. As an example, illustrative embodiments may instrument a mobile device to monitor and collect location data, as well as a user's calendar information, from the mobile device. On a predetermined time interval basis or when specified events occur, the mobile device sends this contextual data to a feature detection module, which then extracts features from the raw contextual data. In this example, the feature detection module determines known landmarks that are associated with the collected location data and determines whether these known landmarks are "significant" to the user (i.e., known landmarks that the user would remember).

Illustrative embodiments send this extracted feature data to an analytics module, which further processes the extracted feature data. The analytics module considers all collected information regarding a user to generate templates for challenge questions, and possibly generate a set of candidate answers for each of the challenge questions, which are personalized to the user. A challenge question template is a model for a challenge question. As an example, a challenge question template may be "Where were you on <DATE> at <TIME>?" where the date and the time represent variables that the analytics module may be able to determine from the extracted feature data. As a result, illustrative embodiments consider what constitutes an event at a certain date and time, which the user would remember.

Using the example above, the analytics module may consider events from collected calendar entries made by the user. Based on parsing the event data, the analytics module may identify and extract the location of the event. If the analytics module determines that the user spent time at that location around the time of the event, then the analytics module is able to determine that that location is significant enough to use as a basis for generating a challenge question that will be personalized to the user. Further, the analytics module may also consider other aspects of the event, such as names of other people that attended the event, when generating the personalized challenge questions for the user. The names and/or telephone numbers of the other people that attended the event may be collected by the user's mobile device using, for example, bluetooth discovery technology.

After the analytics module generates the personalized challenge questions, illustrative embodiments store the generated challenge questions in a database. It is likely that the amount of data used by the analytics module to generate the personalized challenge questions is large and is collected from many different sources. This large amount of collected data is best analyzed in an offline mode, where the analytics module is able to work in the background. However, it should be noted that illustrative embodiments may generate personalized challenge questions on-the-fly on a real-time basis if the need exists.

Illustrative embodiments periodically update the stored challenge questions to prevent system hackers from learning the challenge answers and to ensure that authorized users are presented with challenge questions that are current and relevant. In other words, if challenge questions reference events that occurred too far in the past, then the authorized users may find it difficult to answer these stale challenge questions. The challenge question update cycle time may be highly dependent on what type of data illustrative embodiments are monitoring and collecting. However, illustrative embodiments may update challenge question once every two to three days, for example.

Illustrative embodiments may monitor other public sources of data related to users, such as social media web sites and business networks, to determine whether illustrative embodiments should update or invalidate personalized challenge questions based on the answers to these personalized challenge questions being posted on at least one of the social media web sites or business networks. If a system hacker is able to read these public sources of information, then the system hacker may be able to figure out the correct answer to a personalized challenge question. For example, a user may post in a status update on a social media site that "I had an enjoyable time having dinner with Joe Smith last night in the city." Once this information is publicly posted online, illustrative embodiments will no longer generate or use a challenge question regarding information about a dinner date during the previous evening in the city. Information leaks such as this are manageable by illustrative embodiments. Illustrative embodiments by knowing the generated candidate challenge questions may invalidate a generated challenge question based on information that was parsed from a social media site, which provided an answer to the generated challenge question.

If personalized challenge questions require updating either through the expiration of a predetermined time interval or the occurrence of an event, such as publicly posting information that provides answers to generated challenge questions on social and/or business networks, then illustrative embodiments return to the step of monitoring and collecting contextual data about the users from the mobile devices. However, it should be noted that even if personalized challenge questions are still valid and don't need updating, the software agents on the mobile devices may continuously monitor and collect contextual data about the users so that illustrative embodiments have enough new feature data when illustrative embodiments need to generate new challenge questions personalized to users.

Now, an example of how illustrative embodiments generate personalized challenge questions based on a history of a user's determined location is provided. Illustrative embodiments generate personalized challenge questions from location data, such as global positioning system traces, collected by a user's mobile device. Illustrative embodiments receive the location data from the user's mobile device on demand, on a predetermined time interval basis, or on the occurrence of defined event, for example. Raw mobile device location data may contain errors. However, these location data errors may be filtered out using a data cleaning process.

Illustrative embodiments may then extract location features from the cleaned location data. In this example, illustrative embodiments are interested in determining known landmarks that may be associated with the user of the mobile device using the cleaned location data. Determining known landmarks that may be associated with the user is important because the generation of personalized challenge questions should be based on user-identifiable landmarks or locations. For example, if the location data includes a history of locations collected from the mobile device while the user was driving on a long road trip, it is unlikely that locations along the road trip where the user spent little or no time would be remembered by the user. Consequently, a challenge question such as "Where were you at 12:30 p.m. on Tuesday?" may not have a user-identifiable landmark answer if the user was driving on a desert highway at that time during the user's long road trip. However, it should be noted that illustrative embodiments may not necessarily discount "a desert highway" as a known landmark answer, but may consider this generalized answer as a less desirable one. However, if the user stops at a rest area for more than a threshold period of time, then illustrative embodiments may determine that the rest area is a user-identifiable landmark or location that the user will remember during the long road trip.

To determine user-identifiable landmarks or locations, illustrative embodiments may apply a clustering program to the location data received from the user's mobile device. Applying the clustering program to the location data received from the user's mobile device may result in defining distinct clusters of location data. Each cluster of location data may represent a potential user-identifiable landmark or location. To determine whether a cluster of location data is a user-identifiable landmark, illustrative embodiments may apply a threshold scheme that defines a location data cluster as containing a predetermined threshold number of global positioning system points, for example, and that the predetermined threshold number of global positioning system points are localized at or around a known landmark on a map. Using the example of the long road trip above, the rest area may be located in or near a named town on a map. If the user spends more than a predetermined threshold of time at the rest area, then illustrative embodiments may determine that the rest area is a user-identifiable landmark and automatically label the rest area with the name of the town in which the rest area was located in or near. Alternatively, if the rest area, itself, was listed on the map, then illustrative embodiments may label the rest area as the user-identifiable landmark.

Once illustrative embodiments determine user-identifiable landmarks and associate the user-identifiable landmarks with location data clusters, then illustrative embodiments may generate a user model that corresponds to that particular user. The user model may include a list of these determined user-identifiable landmarks where the user stayed more than the predetermined threshold amount of time. However, if a user model already exists for that particular user, then illustrative embodiments may determine which user-identifiable landmarks are already stored in the user model and only add newly determined user-identifiable landmarks not previously listed in the user model. By incorporating the newly determined user-identifiable landmarks, the most recent location history of the user, and other information, such as the latest status updates posted on social media sites, in a user model, illustrative embodiments are able to generate an up-to-date user model.

Illustrative embodiments utilize data contained in this up-to-date user model to generate challenge questions personalized to the user. Illustrative embodiments will select a recent user-identifiable landmark in the user model and use this recent user-identifiable landmark to generate a personalized challenge question using a stored challenge question template, such as "Where were you at <DATE> at <TIME>?" Using the long road trip example above, the time and date may not be an exact hour and minute time, but rather an approximate time. For example, "Where were you last Thursday afternoon?" may be a challenge question where the correct answer is, "At the Kettleman rest area along Interstate 5.", which may be inferred from the location data received from the mobile device. Also, depending on the location history of the user, illustrative embodiments may generate more than one challenge question based on the challenge question template shown above.

Furthermore, illustrative embodiments also may utilize the user-identifiable landmarks listed in the user model to generate incorrect candidate answers to the personalized challenge question when illustrative embodiments choose to present the personalized challenge question with a set of multiple choice answers. Because the user has been to these landmarks and the landmarks correspond to real locations on a map, a security system hacker may have difficulty in determining the correct answer since all the listed answers appear to be plausible.

Thus, illustrative embodiments provide a method for user authentication. A data processing system accesses at least one of a social network and a business network of each user in a plurality of users. The data processing system monitors user history data of each user in the plurality of users in the at least one of the social network and the business network. The data processing system generates challenge questions requiring a user response based on the monitoring of the user history data of the users. The data processing system evaluates the user response to a generated challenge question. Then, the data processing system triggers a set of events based on evaluating the user response.

With reference now to FIG. 3, a diagram illustrating an example of a challenge question generation system is depicted in accordance with an illustrative embodiment. Challenge question generation system 300 is a system comprising hardware and software components that generate challenge questions personalized to each of a plurality of users of challenge question generation system 300 to authenticate the plurality of users when trying to access a set of one or more secure resources coupled to system 300. Challenge question generation system 300 may be implemented in a network of data processing systems, such as network data processing system 100 in FIG. 1.

Challenge question generation system 300 includes server device 302, client device 304 and client device 306. However, it should be noted that challenge question generation system 300 is only intended as an example and not as a limitation on illustrative embodiments. In other words, challenge question generation system 300 may include any number of server devices, client devices, and other devices not shown.

Sever device 302 and client devices 304 and 306 may be, for example, server 104 and clients 110 and 112 in FIG. 1. Client devices 304 and 306 are clients to server device 302. Also, client devices 304 and 306 may be, for example, mobile communication devices, such as smart phones. Further, client devices 304 and 306 include metrics module 308 and 310, respectively. Metrics modules 308 and 310 may be, for example, software agents that illustrative embodiments use to monitor and collect data regarding the actions and activities of the respective users of client devices 304 and 306.

Metrics modules 308 and 310 generate user history data 312. User history data 312 may include, for example, any information related to a user's activities on a client device, such as user interaction with applications on the client device, user utilization of services provided by the client device, and location data associated with movement of the client device. Also, metrics modules 308 and 310 may perform preliminary data cleaning, such as, for example, filtering the results of collected raw location data to reduce errors.

In this example, client device 306 sends user history data 312 to server device 302. Client device 306 may send user history data 312 to server device 302 on a predetermined time interval basis, for example. Server device 302 utilizes client interaction application 314 to interact with client devices 304 and 306. As a result, client interaction application 314 receives user history data 312 from client device 306 and then sends user history data 312 to data pre-processing and feature extraction module 316.

Data pre-processing and feature extraction module 316 processes user history data 312 to further reduce any errors in the location data contained in user history data 312, to extract features from user history data 312, and to associate those extracted features to measures, such as known landmarks. After data pre-processing and feature extraction module 316 finishes processing user history data 312, data pre-processing and feature extraction module 316 sends the extracted features (i.e., features 318) to analytics module 320 and user models 322. Analytics module 320 generates a raw personalized challenge question and answer set from features 318 and data located in user models 322. User models 322 stores user models for each user. In addition, each user model in user models 322 stores any collected data corresponding to a respective user.

After analytics module 320 generates the raw personalized challenge question and answer set (i.e., raw question 324), analytics module 320 sends raw question 324 to challenge question rendering module 326. Challenge question rendering module 326 renders raw question 324 in a human-readable format, as well as rendering any candidate answers in a human-readable format should a multiple choice question format be desired. Then, challenge question rendering module 326 sends human-readable question 328 to question store 330. Question store 330 provides storage for the generated challenge questions personalized to each of the users associated with a user model in user models 322.

When a user of a client device, such as, client device 304, requests access to a secure resource, such as secure resource 338, authentication module 332 selects a challenge question, such as challenge question 334, which is personalized to the user of client device 304, and send challenge question 334 to client device 304 via client interaction application 314. Secure resource 338 may be, for example, a document, a software application, or a hardware component that has restricted access by only authorized and authenticated users. After receiving challenge question 334, client device 304 sends answer 336 to authentication module 332 via client interaction application 314. If answer 336 is a correct answer to challenge question 334, then authentication module 332 authenticates the user of client device 304 and grants access to secure resource 338. If, however, answer 336 is an incorrect answer to challenge question 334, then authentication module 332 does not authenticate the user of client device 304 and denies access to secure resource 338. It should be noted that authentication module 332 may select and send another challenge question, up to a predetermined number of re-selected challenge questions, in response to receiving an incorrect answer to challenge question 334. Also, even though client interaction application 314, data pre-processing and feature extraction module 316, analytics module 320, user models 322, challenge question rendering module 326, question store 330, and authentication module 332 are shown to reside within server device 302, it should be noted that each of these different components may reside in a different server device or a combination of two or more of these different components may reside in a same server device depending on the illustrative embodiment.

Figure 4:
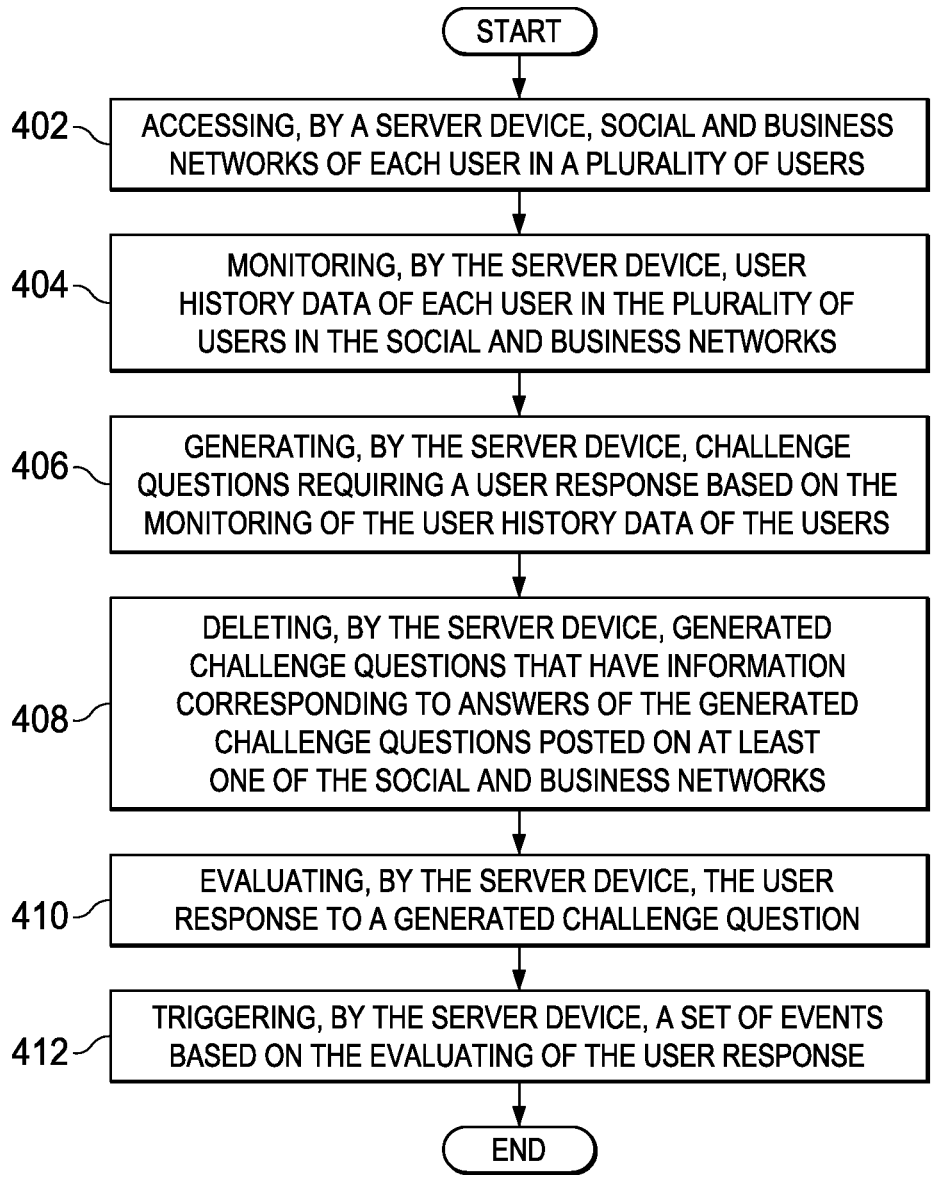
FIG. 4 is a flowchart illustrating a process for generating challenge questions in accordance with an illustrative embodiment.

With reference now to FIG. 4, a flowchart illustrating a process for generating challenge questions is shown in accordance with an illustrative embodiment. The process shown in FIG. 4 may be implemented in a server device, such as, for example, server device 302 in FIG. 3. In addition, the server device may be implemented in a data processing system, such as data processing system 200 in FIG. 2.

The process begins when the server device accesses social and business networks of each user in a plurality of users (step 402). A social network of a user may be, for example, a set of one or more social media web sites that the user has an account with and the user posts information about the user on the one or more social media web sites. A business network of a user may be, for example, a set of one or more enterprises that the user is an employee of and information about the user employee is posted on a web site and/or web page provided by the one or more enterprises.

After accessing the social and business networks of each user in step 402, the server device monitors user history data of each user in the plurality of users in the social and business networks (step 404). The user history data may include, for example, all information regarding each user posted in the social and business networks. Subsequently, the server device generates challenge questions requiring a user response based on the monitoring of the user history data of the users (step 406). The generated challenge questions are personalized to each of the plurality of users.

Furthermore, the server device deletes generated challenge questions that have information corresponding to answers of the generated challenge questions posted on at least one of the social and business networks (step 408). In addition, the server device evaluates the user response to a generated challenge question (step 410). Further, the server device triggers a set of events based on the evaluating of the user response (step 412). The set of events may be, for example, recovering a password for the user and/or authenticating the user to access a secure resource. The process terminates thereafter.

Figure 5B:
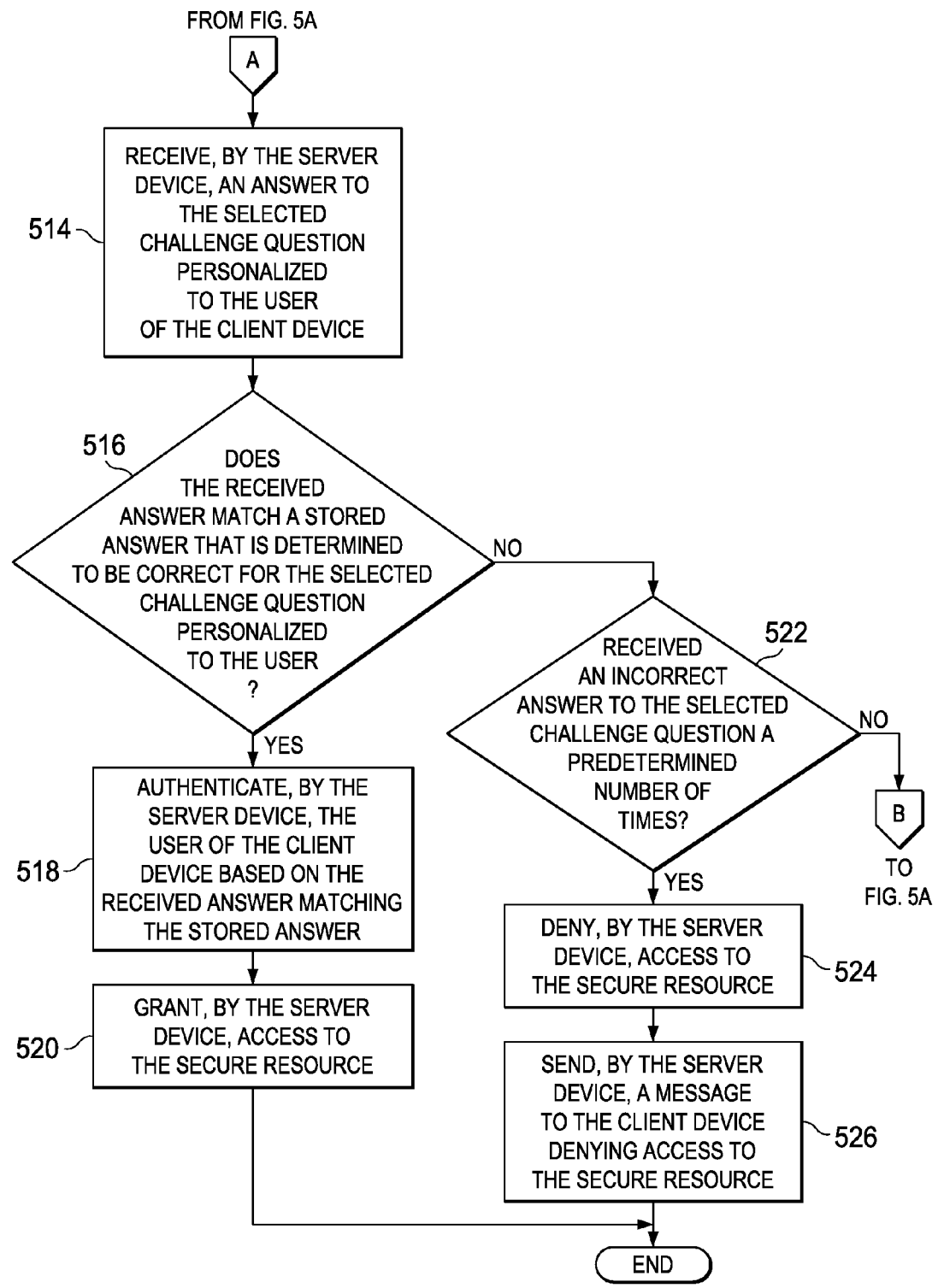

With reference now to FIG. 5A and FIG. 5B, a flowchart illustrating a process for performing user authentication is shown in accordance with an illustrative embodiment. The process shown in FIGS. 5A and 5B may be implemented in a server device, such as, for example, server device 302 in FIG. 3. In addition, the server device may be implemented in a data processing system, such as data processing system 200 in FIG. 2.

The process begins when the server device receives a request from a client device to access a secure resource (step 502). The client device may be, for example client device 306, and the secure resource may be, for example, secure resource 338 in FIG. 3. In response to receiving the request from the client device to access the secure resource in step 502, the server device selects a challenge question personalized to a user of the client device from a storage device to authenticate the user (step 504). The selected challenge question may be, for example, challenge question 334, which was selected from question store 330 in FIG. 3.

In addition, the server device makes a determination as to whether a set of candidate answers is to be included with the selected challenge question personalized to the user (step 506). If the server device determines that a set of candidate answers is not to be included with the selected challenge question personalized to the user, no output of step 506, then the server device sends the selected challenge question personalized to the user to the client device (step 508) and the process proceeds to step 514 thereafter. If the server device determines that a set of candidate answers is to be included with the selected challenge question personalized to the user, yes output of step 506, then the server device selects the set of candidate answers to be included with the selected challenge question personalized to the user of the client device (step 510).

Afterward, the server device sends the selected challenge question personalized to the user with the selected set of candidate answers to the client device (step 512). Subsequently, the server device receives an answer, such as answer 336 in FIG. 3, to the selected challenge question personalized to the user of the client device (step 514). Then, the server device makes a determination as to whether the received answer matches a stored answer that is determined to be correct for the selected challenge question personalized to the user (step 516).

If the server device determines that the received answer does match the stored answer that is determined to be correct for the selected challenge question personalized to the user, yes output of step 516, then the server device authenticates the user of the client device based on the received answer matching the stored answer (step 518) and grants access to the secure resource (step 520). The process terminates thereafter.

If the server device determines that the received answer does not match the stored answer that is determined to be correct for the selected challenge question personalized to the user, no output of step 516, then the server device makes a determination as to whether the server device received an incorrect answer to the selected challenge question a predetermined number of times (step 522). The predetermined number of times may be, for example, three. However, it should be noted that the predetermined number of times may be anywhere in a range from one time to ten times.

If the server device determines that the server device did not receive an incorrect answer to the selected challenge question the predetermined number of times, no output of step 522, then the process returns to step 504 where the server device selects another challenge question personalized to the user. If the server device determines that the server device did receive an incorrect answer to the selected challenge question the predetermined number of times, yes output of step 522, then the server device denies access to the secure resource (step 524). In addition, the server device sends a message to the client device denying access to the secure resource (step 526). The process terminates thereafter.

Figure 6:
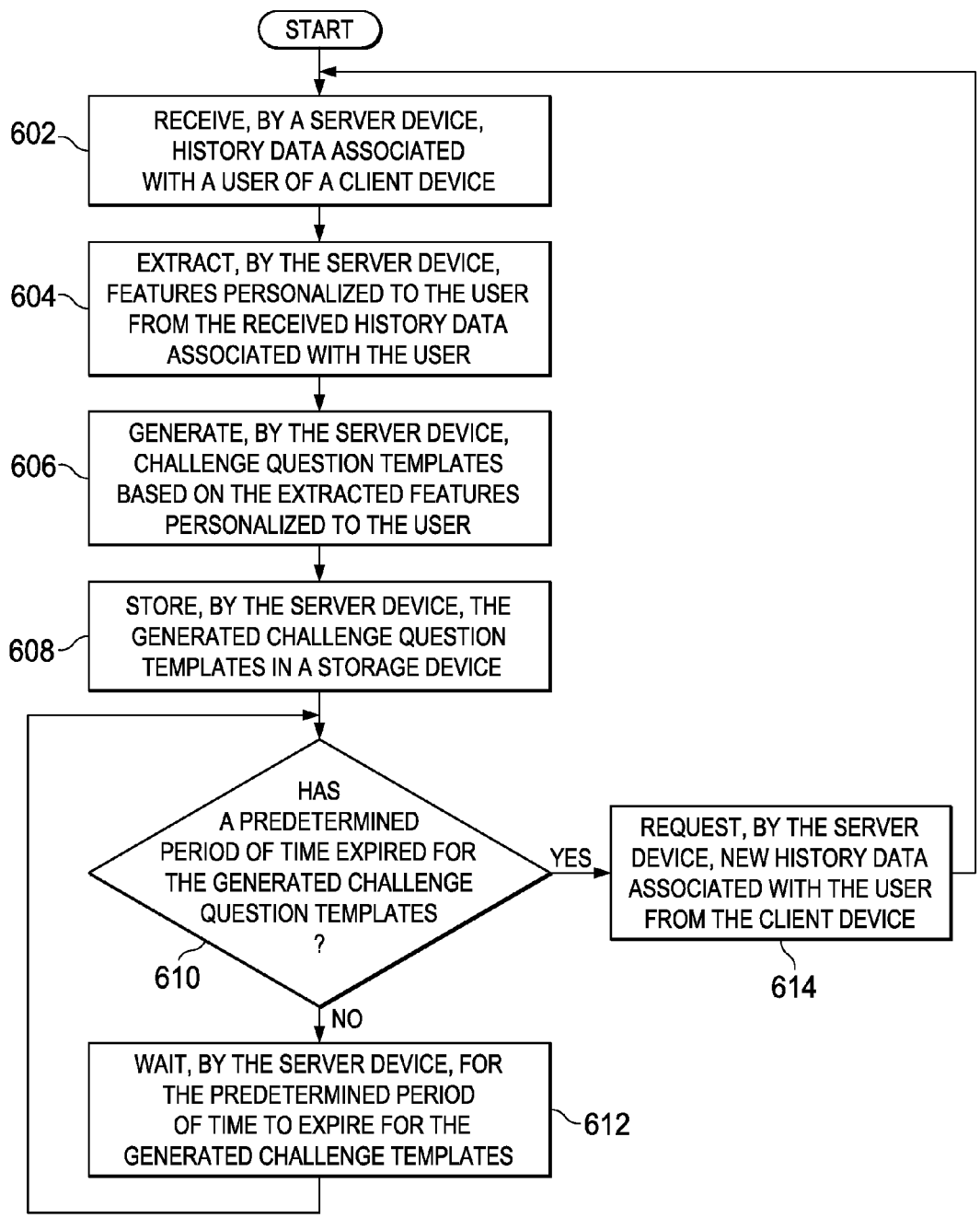
FIG. 6 is a flowchart illustrating a process for generating challenge questions based on user history data in accordance with an illustrative embodiment.

With reference now to FIG. 6, a flowchart illustrating a process for generating challenge questions based on user history data is shown in accordance with an illustrative embodiment. The process shown in FIG. 6 may be implemented in a server device, such as, for example, server device 302 in FIG. 3. In addition, the server device may be implemented in a data processing system, such as data processing system 200 in FIG. 2.

The process begins when the server device receives history data associated with a user of a client device, such as user history data 312 in FIG. 3 (step 602). Then, the server device extracts features personalized to the user, such as features 318 in FIG. 3, from the received history data associated with the user (step 604). In addition, the server device generates challenge question templates based on the extracted features personalized to the user (step 606) and stores the generated challenge question templates in a storage device (step 608).

Further, the server device makes a determination as to whether a predetermined period of time has expired for the generated challenge question templates (step 610). The predetermined period of time may be, for example, a day, a week, a month, or any other increment of time. If the server device determines that the predetermined period of time has not expired for the generated challenge question templates, no output of step 610, then the server device waits for the predetermined period of time to expire for the generated challenge templates (step 612) and the process returns to step 610 thereafter. If the server device determines that the predetermined period of time has expired for the generated challenge question templates, yes output of step 610, then the server device requests new history data associated with the user from the client device (step 614). Thereafter, the process returns to step 602 where the server device receives the new history data associated with the user of the client device.

Figure 7:
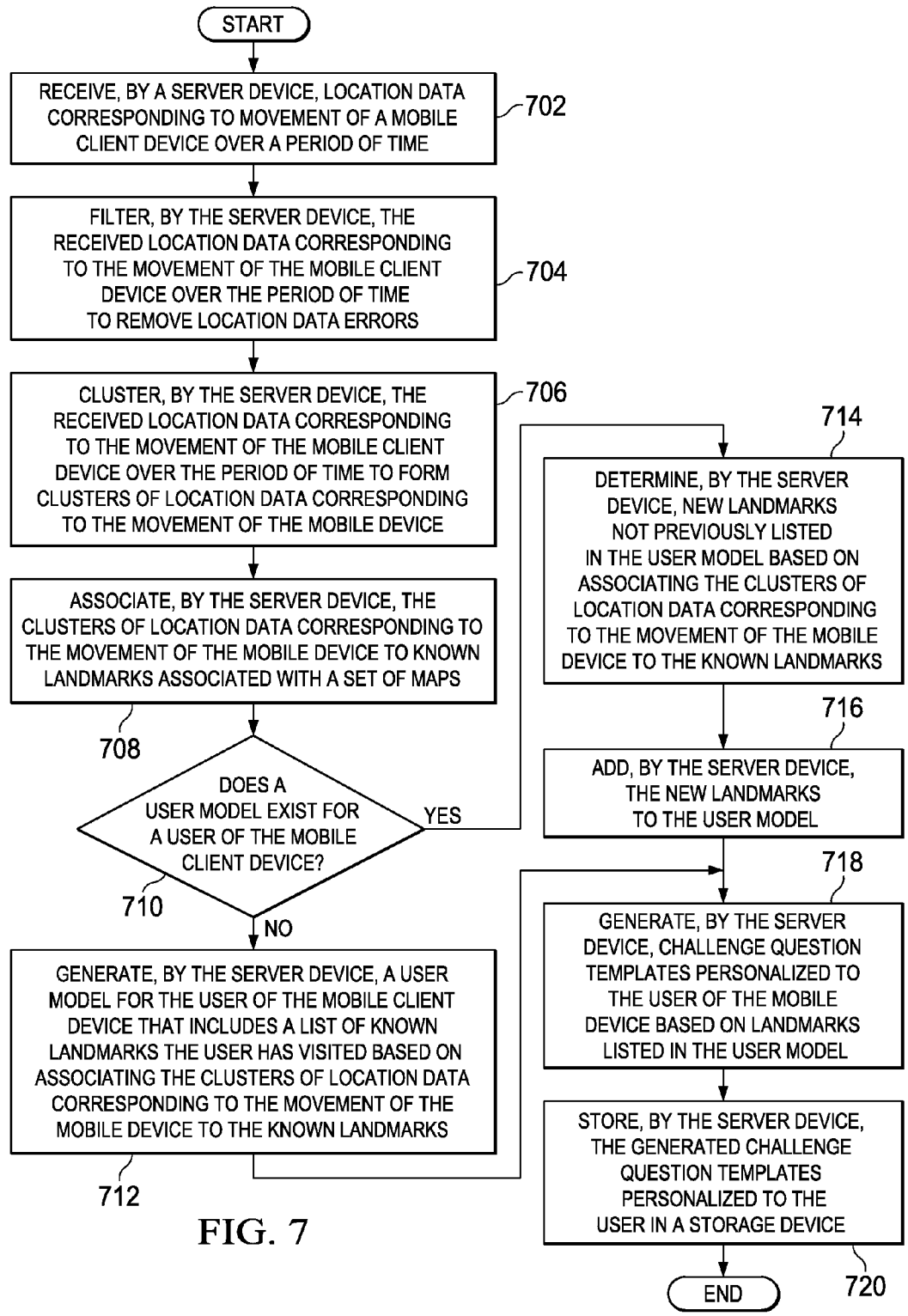
FIG. 7 is a flowchart illustrating a process for generating challenge questions based on client device location data in accordance with an illustrative embodiment.

With reference now to FIG. 7, a flowchart illustrating a process for generating challenge questions based on client device location data is shown in accordance with an illustrative embodiment. The process shown in FIG. 7 may be implemented in a server device, such as, for example, server device 302 in FIG. 3. In addition, the server device may be implemented in a data processing system, such as data processing system 200 in FIG. 2.

The process begins when the server device receives location data corresponding to movement of a mobile client device, such as client device 306 in FIG. 3, over a period of time (step 702). The server device filters the received location data corresponding to the movement of the mobile client device over the period of time to remove location data errors (step 704). In addition, the server device clusters the received location data corresponding to the movement of the mobile client device over the period of time to form clusters of location data corresponding to the movement of the mobile device (step 706).

Further, the server device associates the clusters of location data corresponding to the movement of the mobile device to known landmarks associated with a set of maps (step 708). Then, the server device makes a determination as to whether a user model exists for a user of the mobile client device (step 710). If the server device determines that a user model does not exist for the user of the mobile client device, no output of step 710, then the server device generates a user model for the user of the mobile client device that includes a list of known landmarks the user has visited based on associating the clusters of location data corresponding to the movement of the mobile device to the known landmarks (step 712) and the process proceeds to step 718 thereafter. If the server device determines that a user model does exist for the user of the mobile client device, yes output of step 710, then the server device determines new landmarks not previously listed in the user model based on associating the clusters of location data corresponding to the movement of the mobile device to the known landmarks (step 714).

The server device adds the new landmarks to the user model (step 716). Furthermore, the server device generates challenge question templates personalized to the user of the mobile device based on landmarks listed in the user model (step 718). The server device stores the generated challenge question templates personalized to the user in a storage device (step 720).

Figure 8:
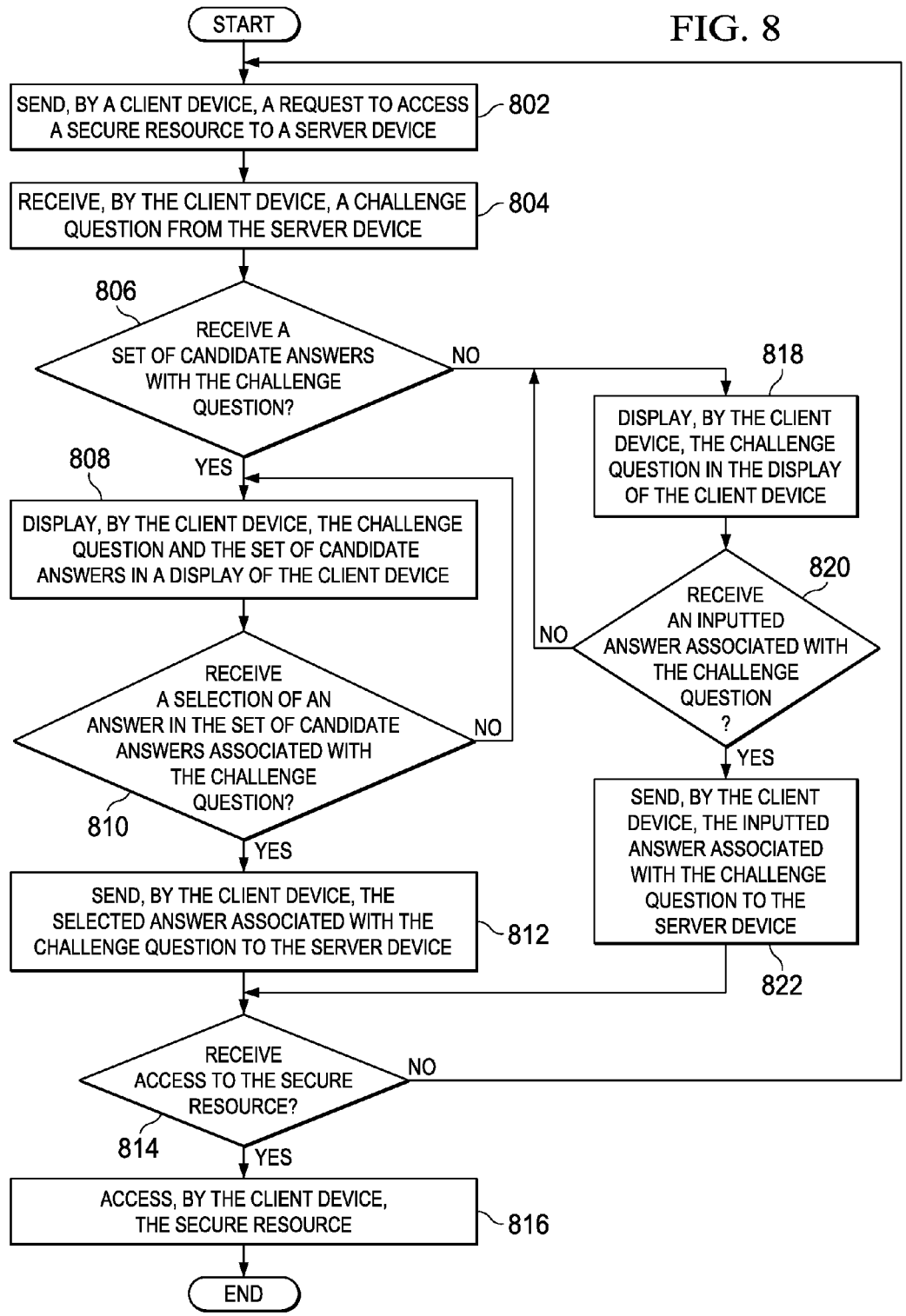
FIG. 8 is a flowchart illustrating a process for a client device in accordance with an illustrative embodiment.

With reference now to FIG. 8, a flowchart illustrating a process for a client device is shown in accordance with an illustrative embodiment. The process shown in FIG. 8 may be implemented in a client device, such as, for example, client device 306 in FIG. 3. In addition, the client device may be implemented in a data processing system, such as data processing system 200 in FIG. 2.

The process begins when the client device sends a request to access a secure resource to a server device, such as server 302 in FIG. 3 (step 802). The secure resource may be, for example, secure resource 338 in FIG. 3. Subsequently, the client device receives a challenge question, such as challenge question 334 in FIG. 3, from the server device (step 804).

Then, the client device makes a determination as to whether the client device received a set of candidate answers with the challenge question (step 806). If the client device determines that the client device did receive a set of candidate answers with the challenge question, yes output of step 806, then the client device displays the challenge question and the set of candidate answers in a display of the client device, such as display 214 in FIG. 2 (step 808). Afterward, the client device makes a determination as to whether the client device received a selection of an answer in the set of candidate answers associated with the challenge question, such as answer 336 in FIG. 3 (step 810).

If the client device determines that the client device did not receive a selection of an answer in the set of candidate answers associated with the challenge question, no output of step 810, then the process returns to step 808 where the client device continues to display the challenge question. If the client device determines that the client device did receive a selection of an answer in the set of candidate answers associated with the challenge question, yes output of step 810, then the client device sends the selected answer associated with the challenge question to the server device (step 812). Subsequently, the client device makes a determination as to whether the client device received access to the secure resource (step 814).

If the client device determines that the client device did not receive access to the secure resource, no output of step 814, then the process returns to step 802 where the client device sends another request to access the secure resource. If the client device determines that the client device did receive access to the secure resource, yes output of step 814, then the client device accesses the secure resource (step 816). Thereafter, the process terminates.

Returning again to step 806, if the client device determines that the client device did not receive a set of candidate answers with the challenge question, no output of step 806, then the client device displays the challenge question in the display of the client device (step 818). Afterward, the client device makes a determination as to whether the client device received an inputted answer associated with the challenge question (step 820). The inputted answer may be, for example, a natural language answer. If the client device determines that the client device did not receive an inputted answer associated with the challenge question, no output of step 820, then the process returns to step 818 where the client device continues to display the challenge question. If the client device determines that the client device did receive an inputted answer associated with the challenge question, yes output of step 820, then the client device sends the inputted answer associated with the challenge question to the server device (step 822). Thereafter, the process returns to step 814 where the client device makes a determination as to whether the client device received access to the secure resource.

Thus, illustrative embodiments provide a method for automatically generating challenge questions inferred from user history data for user authentication. The descriptions of the various illustrative embodiments have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of systems, methods, and computer program products according to various illustrative embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for user authentication, the method comprising:

monitoring, by a data processing system, first user history data of a user in a set of social media websites, where the user publicly posts information about the user on the set of social media websites;

instrumenting with a software agent, by the data processing system, a client device corresponding to the user, where the software agent collects second user history data of user interactions with applications on the client device and user interactions with services provided by the client device;

receiving, by the data processing system, the second user history data collected by the software agent on the client device of the user interactions with the applications on the client device and the user interactions with the services provided by the client device;

generating, by the data processing system, challenge questions requiring a user response based on the first user history data of the user monitored in the set of social media websites and the second user history data collected by the software agent on the client device of the user interactions with the applications on the client device and the user interactions with the services provided by the client device;

invalidating, by the data processing system, based on the monitoring, generated challenge questions when information corresponding to answers of the generated challenge questions is publicly posted on the set of social media websites of the user;

deleting, by the data processing system, generated challenge questions that have information corresponding to answers of the generated challenge questions publicly posted on the set of social media websites of the user;

evaluating, by the data processing system, the user response to a generated challenge question; and triggering, by the data processing system, a set of events based on the evaluating of the user response.

2. The method of claim 1 further comprising:

receiving, by the data processing system, a request from the client device to access a secure resource; and selecting, by the data processing system, a challenge question personalized to the user of the client device to authenticate the user.

3. The method of claim 2 further comprising:

responsive to the data processing system determining that a set of candidate answers is to be included with the selected challenge question personalized to the user of the client device, selecting, by the data processing system, the set of candidate answers to be included with the selected challenge question personalized to the user of the client device; and sending, by the data processing system, the selected challenge question personalized to the user and the selected set of candidate answers to the client device.

4. The method of claim 3 further comprising:

receiving, by the data processing system, an answer to the selected challenge question personalized to the user of the client device, wherein the answer was selected from the set of candidate answers included with the selected challenge question;

responsive to the data processing system determining that the received answer to the selected challenge question does match a stored answer that is determined to be correct for the selected challenge question personalized to the user, authenticating, by the data processing system, the user of the client device based on the received answer matching the stored answer; and granting, by the data processing system, access to the secure resource based on the authenticating of the user.

5. The method of claim 4 further comprising:

responsive to the data processing system determining that the received answer to the selected challenge question does not match the stored answer that is determined to be correct for the selected challenge question personalized to the user, determining, by the data processing system, that an incorrect answer to the selected challenge question was received a predetermined number of times; and responsive to the data processing system determining that an incorrect answer to the selected challenge question was received the predetermined number of times, denying, by the data processing system, the access to the secure resource.

6. The method of claim 1 further comprising:

responsive to the data processing system receiving the second user history data collected by the software agent on the client device of the user interactions with the applications on the client device and the user interactions with the services provided by the client device, extracting, by the data processing system, features personalized to the user from the second user history data associated with the user; and generating, by the data processing system, challenge question templates based on the extracted features personalized to the user.

7. The method of claim 6 further comprising:

determining, by the data processing system, that a predetermined period of time expired for the generated challenge question templates; and responsive to the data processing system determining that the predetermined period of time expired for the generated challenge question templates, requesting, by the data processing system, new user history data from the client device.

8. The method of claim 1 further comprising:

receiving, by the data processing system, location data corresponding to movement of the client device;

clustering, by the data processing system, the received location data corresponding to the movement of the client device to form clusters of location data corresponding to the movement of the client device; and associating, by the data processing system, the clusters of location data corresponding to the movement of the client device to known landmarks associated with a set of maps.

9. The method of claim 8 further comprising:

determining, by the data processing system, new landmarks not previously listed in a user model based on the associating of the clusters of location data corresponding to the movement of the client device to the known landmarks; and adding, by the data processing system, the new landmarks to the user model.

10. The method of claim 1 further comprising:

generating, by the data processing system, challenge question templates personalized to the user of the client device based on landmarks listed in a user model corresponding to the user.

11. The method of claim 1 further comprising:

generating, by the data processing system, a user model for the user of the client device that includes a list of known landmarks the user has visited based on associating clusters of location data corresponding to movement of the client device to known landmarks on a set of maps.

12. The method of claim 11, wherein the clusters of location data corresponding to the movement of the client device are geographic locations where the client device stayed for more than a threshold period of time.

13. The method of claim 1, wherein the set of events is at least one of recovering a password for the user and authenticating the user to access a secure resource.

14. The method of claim 1, wherein the client device is a mobile data processing system, and wherein the mobile data processing system is one of a cellular telephone, a smart phone, a personal digital assistant, a gaming device, or a handheld computer.

15. The method of claim 1, wherein the client device includes a global positioning system unit that provides location data corresponding to movement of the client device, and wherein the location data is global positioning system coordinates of the client device.

16. A computer system for user authentication, the computer system comprising:
a bus system;
a storage device connected to the bus system, wherein the storage device stores computer readable program code; and
a processor unit connected to the bus system, wherein the processor unit executes the computer readable program code to monitor first user history data of a user in a set of social media websites, where the user publicly posts information about the user on the set of social media websites; instrument with a software agent a client device corresponding to the user, where the software agent collects second user history data of user interactions with applications on the client device and user interactions with services provided by the client device; receive the second user history data collected by the software agent on the client device of the user interactions with the applications on the client device and the user interactions with the services provided by the client device; generate challenge questions requiring a user response based on the first user history data of the user monitored in the set of social media websites and the second user history data collected by the software agent on the client device of the user interactions with the applications on the client device and the user interactions with the services provided by the client device; invalidate, based on the monitoring, generated challenge questions when information corresponding to answers of the generated challenge questions is publicly posted on the set of social media websites of the user; delete generated challenge questions that have information corresponding to answers of the generated challenge questions publicly posted on the set of social media websites of the user; evaluate the user response to a generated challenge question; and trigger a set of events based on the evaluating of the user response.

17. A computer program product stored on a computer readable storage device having computer readable program code encoded thereon that is executable by a computer for user authentication, the computer program product comprising:
computer readable program code for monitoring first user history data of a user in a set of social media websites, where the user publicly posts information about the user on the set of social media websites;
computer readable program code for instrumenting with a software agent a client device corresponding to the user, where the software agent collects second user history data of user interactions with applications on the client device and user interactions with services provided by the client device;
computer readable program code for receiving the second user history data collected by the software agent on the client device of the user interactions with the applications on the client device and the user interactions with the services provided by the client device;
computer readable program code for generating challenge questions requiring a user response based on the first user history data of the user monitored in the set of social media websites and the second user history data collected by the software agent on the client device of the user interactions with the applications on the client device and the user interactions with the services provided by the client device;
computer readable program code for invalidating, based on the monitoring, generated challenge questions when information corresponding to answers of the generated challenge questions is publicly posted on the set of social media websites of the user;
computer readable program code for deleting generated challenge questions that have information corresponding to answers of the generated challenge questions publicly posted on the set of social media websites of the user;
computer readable program code for evaluating the user response to a generated challenge question; and
computer readable program code for triggering a set of events based on the evaluating of the user response.

18. The computer program product of claim 17 further comprising:
computer readable program code for receiving a request from the client device to access a secure resource; and
computer readable program code for selecting a challenge question personalized to the user of the client device to authenticate the user.

19. The computer program product of claim 18 further comprising:
computer readable program code, responsive to determining that a set of candidate answers is to be included with the selected challenge question personalized to the user of the client device, for selecting the set of candidate answers to be included with the selected challenge question personalized to the user of the client device; and
computer readable program code for sending the selected challenge question personalized to the user and the selected set of candidate answers to the client device.

* * * * *